(12) United States Patent
Dong et al.

(10) Patent No.: US 8,255,553 B2
(45) Date of Patent: Aug. 28, 2012

(54) MULTIMEDIA CLIENT/SERVER SYSTEM WITH REMOTE CONTROL SIGNALLING AND METHODS FOR USE THEREWITH

(75) Inventors: Sui Wu Dong, Markham (CA); David M. Olive, Brampton (CA)

(73) Assignee: Vixs Systems Inc., Toronto, Ontario ( * ) Notice: Subject to any disclaimer, the term of this patent is extended or adjusted under 35 U.S.C. 154(b) by 1239 days.

(21) Appl. No.: 11/600,553

(22) Filed: Nov. 16, 2006

(65) Prior Publication Data

US 2008/0120673 A1    May 22, 2008

(51) Int. Cl.
*G06F 15/16* (2006.01)
*H04N 7/00* (2006.01)
*H04N 5/44* (2006.01)

(52) U.S. Cl. .................. 709/231; 348/552; 348/734

(58) Field of Classification Search .................. 709/231; 348/552, 734
See application file for complete search history.

(56) References Cited

U.S. PATENT DOCUMENTS

| | | | | |
|---|---|---|---|---|
| 6,084,638 | A * | 7/2000 | Hare et al. | 348/552 |
| 2006/0075108 | A1* | 4/2006 | Sylvain | 709/227 |
| 2006/0095942 | A1* | 5/2006 | van Beek | 725/81 |
| 2006/0209745 | A1* | 9/2006 | MacMullan et al. | 370/328 |
| 2006/0210278 | A1* | 9/2006 | Cregg et al. | 398/107 |
| 2007/0089144 | A1* | 4/2007 | Du Breuil et al. | 725/81 |

\* cited by examiner

*Primary Examiner* — Asad M. Nawaz
*Assistant Examiner* — Nicholas Jensen
(74) *Attorney, Agent, or Firm* — Garlick & Markison; Bruce E. Stuckman (57) ABSTRACT

A client module includes a client transceiver module that receives and demodulates a link signal from a multimedia server module over the communications link to produce a received encoded signal, the link signal including a multimedia signal from a multimedia device. A decoder module decodes the received encoded signal into a decoded output signal that is formatted for the at least one client device. A remote receiver module receives remote control signals from a remote control device wherein the remote control signals are formatted for reception by the multimedia device. A remote control signal encoder module encodes the remote control signals into encoded control signals for transmission to the multimedia server module by the client transceiver module.

17 Claims, 7 Drawing Sheets

MULTIMEDIA CLIENT/SERVER SYSTEM WITH REMOTE CONTROL SIGNALLING AND METHODS FOR USE THEREWITH

TECHNICAL FIELD OF THE INVENTION

This invention relates generally to wireless communication systems and more particularly to in-home local area networking for content such as multimedia.

BACKGROUND OF THE INVENTION

With the number of households having multiple television sets increasing, and many users wanting the latest and greatest video viewing services, many households have multiple satellite receivers, cable set-top boxes, modems, et cetera. For in-home Internet access, each computer or Internet device has its own Internet connection. As such, each computer or Internet device includes a modem.

As an alternative, an in-home wireless local area network (LAN) may be used to provide Internet access and to communicate multimedia information to multiple devices within the home. In such an in-home local area network, each computer or Internet device includes a network card to access a server. The server provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

Many of these multimedia devices, such as television sets, cable television boxes, compact disk (CD) and digital video disk (DVD) players, have an associated remote control device that is provided when the device is purchased or that are universal remote control devices that are programmed to operate in conjunction with one or more multimedia devices. However, these remote control devices generally operate using infrared (IR) line or sight transmissions that require the remote control to be in the same room and pointed at the multimedia device, a configuration that does not lend itself to use in a multimedia network that may be spread out over a wider area.

DETAILED DISCUSSION OF A PREFERRED EMBODIMENT

Figure 1:
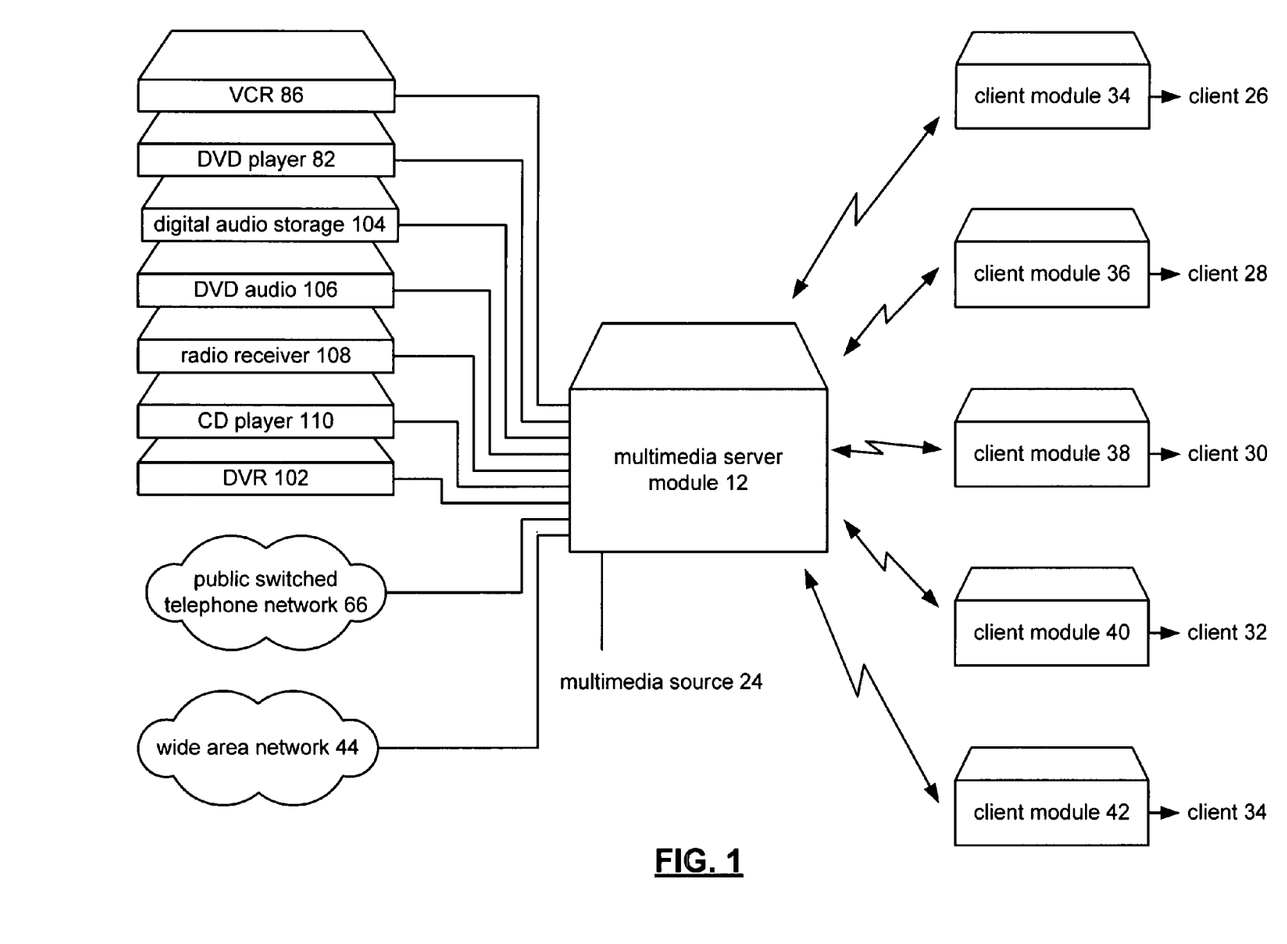
FIG. 1 presents a pictorial representation of a multimedia client server system in accordance with an embodiment of the present invention.

FIG. 1 presents a pictorial representation of a multimedia client server system in accordance with an embodiment of the present invention. The multimedia client server system includes multimedia server module 12, client modules 34, 36, 38, 40 and 42 that are coupled to clients 26, 28, 30, 32, and 34, and a plurality of multimedia sources. The multimedia sources include video cassette recorder (VCR) 86, digital video disk (DVD) player 82, digital video recorder (DVR) 102, digital audio storage device 104, DVD audio 106, radio receiver 108, CD player 110, public switch telephone network 66, wide area network 44 (such as a private network, public network, satellite network, cable network and/or the Internet) for accessing broadcast, stored or streaming audio, video and/or other multimedia content and/or any other type of audio, video and/or multimedia source 24.

In an embodiment of the present invention, the clients 26-34 may select playback from, and/or connection to, any one of the multimedia sources. The selection request from each client module would identify the desired multimedia source, the client, the desired service and any other information to assist the multimedia server module 12 in processing the request. As such, one client may be accessing the Internet, while another client is watching a satellite broadcast channel, while another is listening to a CD playback, while another is talking on the telephone, and yet another is watching a DVD playback. This is all done via the multimedia server module 12 without requiring the clients to have direct access to the multimedia sources and without the requirement that each client have its own multimedia source and/or multimedia source connection.

The multimedia server module 12 and one or more of the client modules 34, 36, 38, 40 and 42 include one or more features for transmitting commands through the multimedia network, such as selection requests and other commands from a remote control device associated with a multimedia source, such as VCR 86, DVD player 82, digital audio storage device 104, DVD audio 106, radio receiver 108, CD player 110 and/or DVR 102, as will be described in greater detail in the Figures that follow, and in particular, with reference to FIGS. 2-11.

Figure 2:
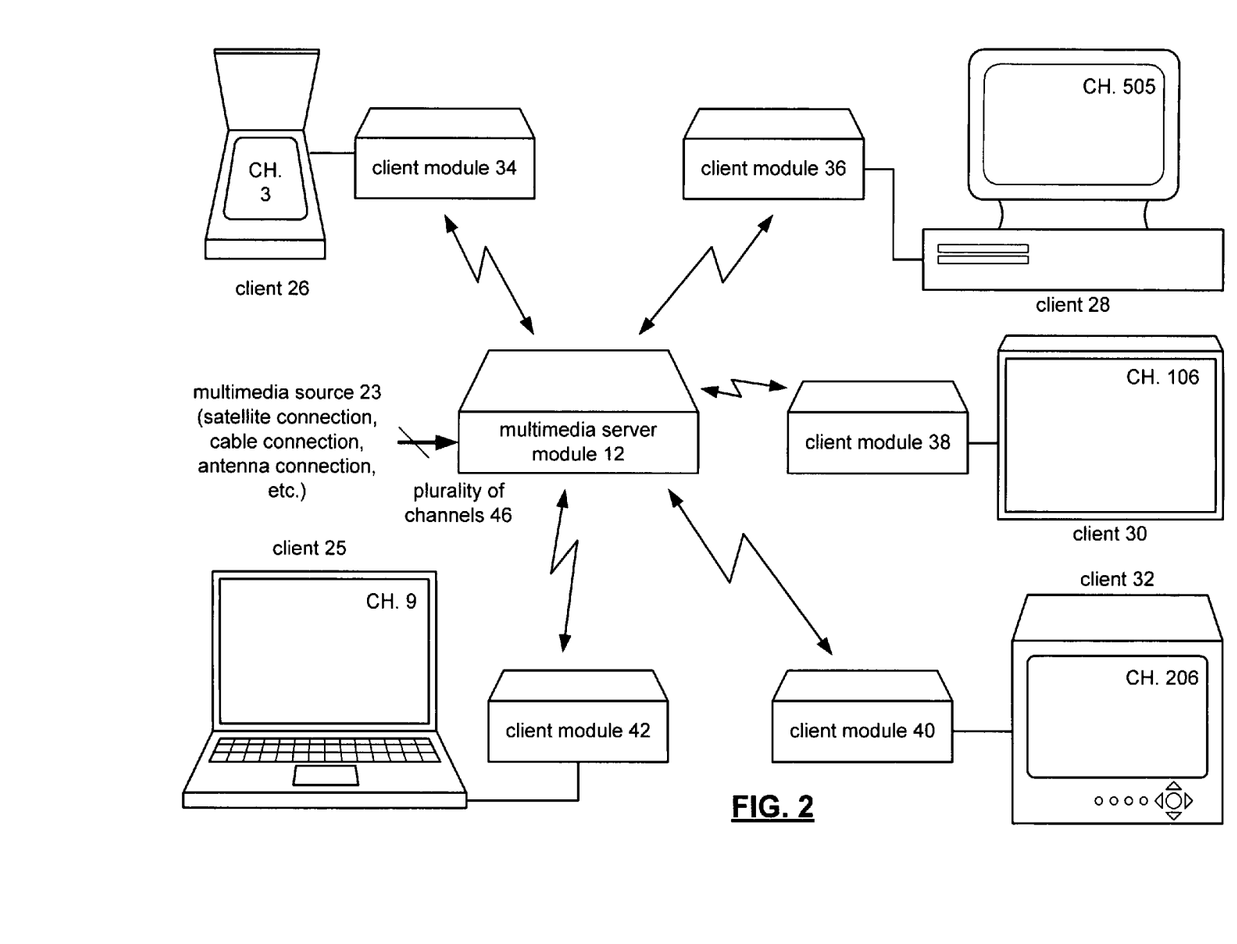
FIG. 2 presents a pictorial representation of a multimedia client/server system in accordance with an embodiment of the present invention.

FIG. 2 presents a pictorial representation of a multimedia client/server system in accordance with an embodiment of the present invention. In particular, a multimedia client/server system includes a multimedia server module 12, a plurality of client modules 34, 36, 38, 40 and 42 that are operably coupled to a plurality of clients 25, 26, 28, 30, and 32. The multimedia server module 12 is operably coupled to receive a plurality of channels 46 from a multimedia source 23. The multimedia source 23 can be a broadcast, stored or steaming multimedia signal, from a video cassette recorder (VCR) 86, digital video disk (DVD) player 82, digital video recorder (DVR) 102 digital audio storage device 104, DVD audio 106, radio receiver 108, CD player 110, public switch telephone network 66, wide area network 44 (such as a private network, public network, satellite network, cable network and/or the Internet for accessing broadcast, stored or streaming audio, video and/or other multimedia content) and/or any other type of audio, video and/or multimedia source 24. As one of average skill in the art will appreciate, the multimedia server module 12 may be a stand-alone device, may be incorporated in a satellite receiver, set-top box, cable box, HDTV tuner, home entertainment receiver, et cetera. In addition, the multimedia server module 12 may be implemented using discrete components, integrated circuits, and/or a combination thereof.

The multimedia server module 12 communicates with the plurality of client modules 34, 36, 38, 40, and 42 via a communication path such as a radio frequency communication link, optical communication link or wired communication link. As such, the multimedia server module 12 and each of the client modules 34, 36, 38, 40 and 42 each include a transceiver that operates to send and receive data via the communication link.

As shown, each client module is operably coupled to one of the clients. For example, client module 34 is operably coupled to client 26, which is representative of a personal digital assistant. Client module 36 is operably coupled to client 28, which is representative of a personal computer. Client module 38 is operably coupled to client 30, which is representative of a monitor (e.g., LCD monitor, flat panel monitor, CRT monitor, et cetera). Such a monitor may include speakers, or a speaker connection, control functions including channel select, volume control, picture quality, et cetera. Client module 40 is operably coupled to client 32, which may be a television set, high definition television (HDTV), standard definition television (SDTV), a home theatre system, et cetera. Client module 42 is operably coupled to client 25, which is representative of a laptop computer.

As one of average skill in the art will appreciate, each client module may be a separate device from its associated client or embedded within the client. In addition, one of average skill in the art will further appreciate that the client modules 34, 36, 38, 40 and 42 may be implemented utilizing discrete components and/or integrated circuits.

In an embodiment of the present invention, each of the clients, via its associated client module, selects one or more channels from the plurality of channels 46. As shown, client 26 has selected channel 3 of the plurality of channels for viewing. Accordingly, client module 34 relays the channel selection of channel 3 to the multimedia server module 12. The multimedia server module 12 selects channel 3 from the plurality of channels 46. The data corresponding to channel 3 is then time multiplexed with the data for the other channels and transmitted from the multimedia server module 12 to each of the client modules 34, 36, 38, 40 and 42. Client module 34 monitors the transmission from the multimedia server module 12 and extracts the data corresponding to channel 3. The extracted data for channel 3 is then provided to the client 26 for display.

Client module 36, 38, 40 and 42 perform a similar function for their associated clients 28, 30, 32 and 25, respectively. As shown, client 28 has selected channel 505, client 30 has selected channel 106, client 32 has selected channel 206 and client 25 has selected channel 9. The client modules 36, 38, 40 and 42 provide the channel selection of its respective client to the multimedia server module 12. Multimedia server module 12 extracts the selected channels from the plurality of channels for each selection request, multiplexes the data for each of the selected channels (for this example channel 3, 9, 106, 206 and 505) into a stream of data. The stream of data is then transmitted to each of the client modules. Each client module extracts the appropriate data of the selected channel for its respective client. For example, client module 36 monitors the transmitted data for data related to channel 505, client module 38 monitors for data related to channel 106, client module 40 monitors the transmission for data related to channel 206 and client module 42 monitors the transmission for data related to channel 9.

From each client's prospective, the client 25, 26, 28, 30 and 32 has independent access to the multimedia source 23. Accordingly, client 26 may at any time change its channel selection from, for example, channel 3 to channel 120. The client module 34 provides the channel selection request which may be the absence of acknowledgements to the multimedia server module 12, which now retrieves data related to channel 120 for client 36 as opposed to channel 3. As an alternate embodiment, the functionality of client modules 34, 36, 38, 40 and 42 may vary. For example, client module 34 may not provide all the independent functionality that client module 36 does. For example, client module 34 may not have independent channel selection capabilities but only selecting channels that one of the other clients have selected. Alternatively, one client module may service a plurality of clients.

In an embodiment of the present invention, one or more multimedia devices, such as VCR 86, DVD player 82, Digital audio storage 104, DVD audio 106, radio receiver 108, CD player 110 and/or DVR 102, or a network gateway or other control device (not shown) associated with public switched telephone network 66, wide area network 44, have a remote control device associated therewith for transmitting set-up information to the multimedia device and for providing commands that control the multimedia signal produced therefrom. For example, the remote control device may, select a particular television channel, a particular selection from a CD or DVD, select recording or playback options, provide commands to pause, rewind or fast forward playback of audio or video programming, it may adjust the audio volume of audio playback, etc. In order to allow flexibility of placement of these multimedia devices and particularly, to allow these remote control devices to be used in the multimedia network, even when the associated multimedia device is out of range, the signals from these remote control devices can be transmitted instead to a client module, such as client module 34, 36, 38, 40 and/or 42, and through multimedia server module 12; The remote control signals are reproduced by the multimedia server module 12, and transmitted to the corresponding multimedia source, is if they were coming directly from the remote control device 140. In this fashion, a user located near a client device, such as client 30, may control a multimedia source, such as DVD player 82 using the remote control device associated with DVD player 82, even though DVD player 82 may be located in a different room. The user simply points the remote control device at client module 38 to transmit the commands through the network to DVD player 82.

Further details regarding the invention including several alternative embodiments will be described further in conjunction with FIGS. 3-7 that follow.

Figure 3:
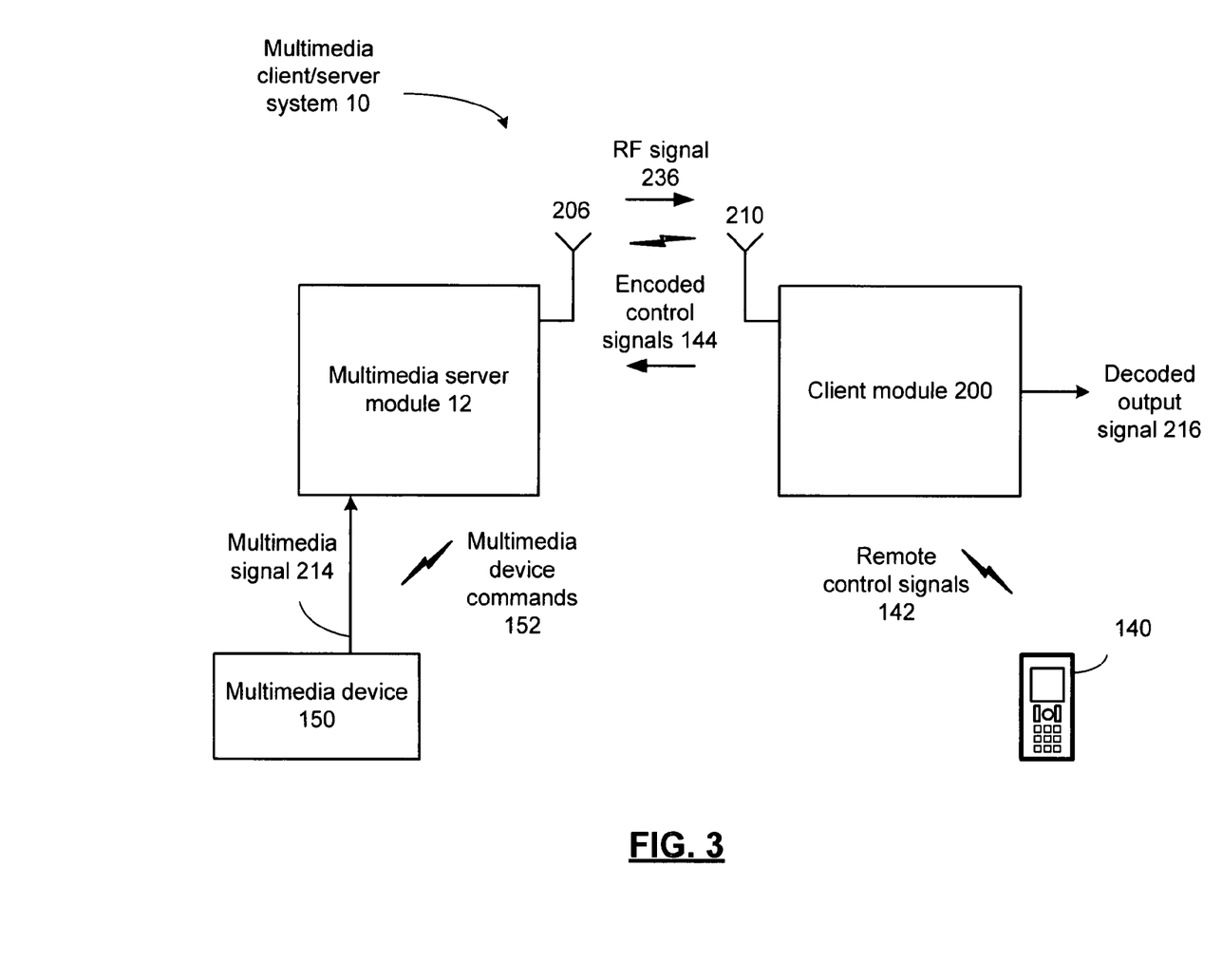
FIG. 3 presents a block diagram representation of a multimedia client/server system 10 in accordance with an embodiment of the present invention.

FIG. 3 presents a block diagram representation of a multimedia client/server system 10 in accordance with an embodiment of the present invention. In particular, the multimedia client/server system 10 includes multimedia server module 12 that transmits a multimedia signal 214, such as a broadcast, stored or streaming signal from multimedia device 150 that has an associated remote control device 140. Multimedia server module 12 transmits, via antenna 206, a radio frequency (RF) signal that contains the multimedia content from multimedia signal 214. This RF signal is transmitted at a carrier frequency corresponding to a channel such as channel A of an RF spectrum. Client module 200, (such as client modules 34, 36, 38, 40 and 42) receives the RF signal via antenna 210 and produces a decoded output signal 216, that is formatted for the particular client device or devices that is/are associated with client module 200. Remote control signals 142 are received by client module 200 and encoded into encoded control signals 144 that are transmitted back over the RF communication link to the multimedia server module 12, that is located in proximity to multimedia device 150. Multimedia server module 12, in turn reproduces multimedia device commands 152, such as remote control signals in the format of remote control device 140 and multimedia device 150, and transmits these multimedia device commands to the remote control receiver of multimedia device 150.

It should be noted that channel A represents a channel of an RF spectrum corresponding to one or more carrier frequencies. This is as opposed to channels 3, 9, 106, 206 and 505 discussed in association with FIG. 2 where "channel", is this context, was used primarily to denote different streams of multimedia content such as "The Weather Channel", "The Discovery Channel" or "Gone with the Wind". In the event that noise, interference or fading hamper the performance of one of the channels, the multimedia server module 12 can switch to a different channel.

In an embodiment of the present invention, the transmitted multimedia content can further be encrypted in the encoding process and decrypted in the decoding process, such as by RSA encryption, WEP, or protected using other secure access protocols such as MAC address filtering, so that if the content is wirelessly received by an authorized client device, the multimedia content can be otherwise protected.

While client module 200 and multimedia server module 12 are described above as being coupled by an RF communication link, other wireless and wired communication links, such as optical, powerline, Ethernet, etc, can similarly be used in the broader scope of the present invention to transmit the encoded control signals 144 via alternative link signals that are formatted in accordance with the particular communication link that is employed.

Figure 4:
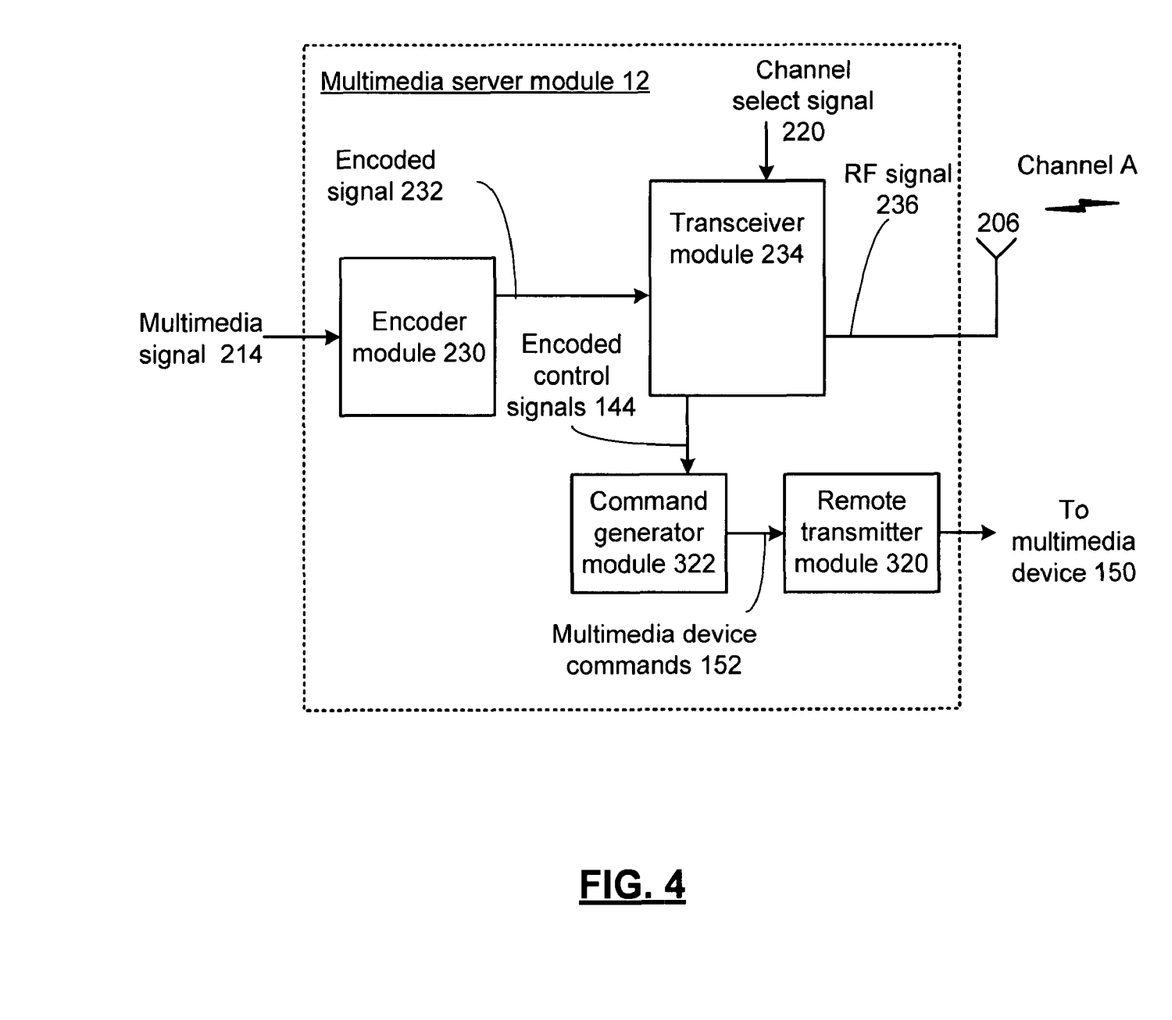
FIG. 4 presents a block diagram representation of a multimedia server module 12 in accordance with an embodiment of the present invention.
Figure 5:
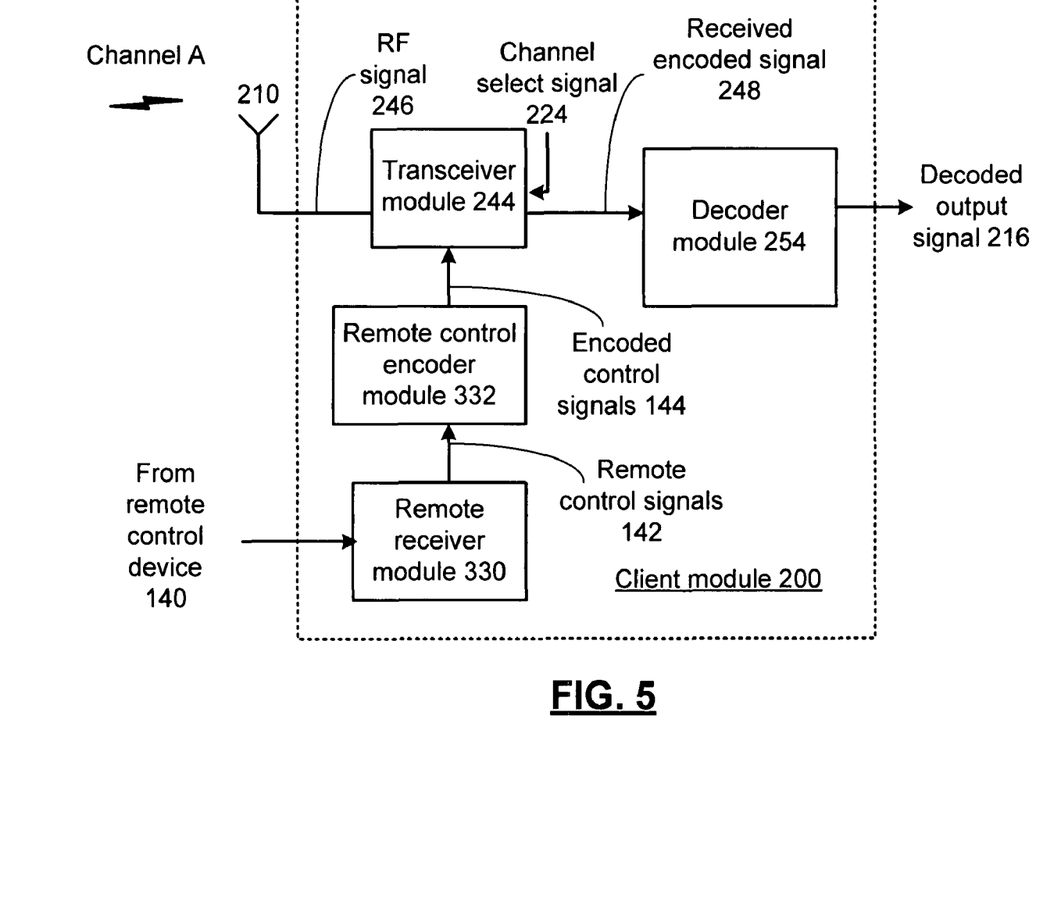
FIG. 5 presents a block diagram representation of a client module 200 in accordance with an embodiment of the present invention.

Further details including particular implementations of multimedia server module 12 and client module 200 are presented in conjunction with FIGS. 4 and 5.

FIG. 4 presents a block diagram representation of a multimedia server module in accordance with an embodiment of the present invention. In particular, multimedia server module 12 includes an encoder module 230 for producing an encoded signal 232 from unencoded multimedia input signal 214. In an embodiment of the present invention, the encoding scheme may be one or more of multilevel, multiphase and multifrequency encoding, non-return to zero encoding, Manchester encoding, block encoding and/or nB/mB encoding wherein n>m. For example, the nB/mB may be 4B/5B encoding where 4 bits of actual data are converted into 5 bits of encoded data.

Encoding may further include compression, transrate and transcode encoding of the multimedia signal based on the content and format of multimedia signal 214 and the bandwidth and performance of channel A. In an embodiment, the multimedia signal 214 includes an analog composite video signal that is formatted in any of a number of video formats including National Television Systems Committee (NTSC), Phase Alternating Line (PAL) or Sequentiel Couleur Avec Memoire (SECAM). The encoded signal 232 may be digitized, compressed, and channel coded for transmission at low data rates in weak channel conditions or higher data rates in stronger channel conditions. Alternatively, multimedia signal 214 can be already in a digital format such as a Motion Picture Experts Group (MPEG) format (such as MPEG1, MPEG2, MPEG4), a Society of Motion Picture and Television Engineers (SMPTE) standard such as VC1, H.264, Quicktime format, Real Media format, Windows Media Video (WMV) or Audio Video Interleave (AVI), or another digital video format, either standard or proprietary. In this case, the encoding performed by encoder module 230 may be limited to encoding of the data for the channel, based on the strength or quality of the channel conditions, with or without further compression.

In an embodiment of the present invention, encoder module 230 generates an encoded signal 232 from the multimedia signal 214 that is in a digital format such as an MPEG, a Society of Motion Picture and Television Engineers (SMPTE) standard such as VC1, H.264, Quicktime format, Real Media format, Windows Media Video (WMV) or Audio Video Interleave (AVI), or another digital video format, either standard or proprietary. Transceiver module 234, in turn, produces RF signal 236 that includes the encoded signal 232, and wirelessly transmits the RF signal 236 to a client device, such as through client module 200. In an embodiment of the present invention, encoder module 230 can operate as a transcoder to receive a multimedia signal 214 in a first digital format, decode this signal and re-encode it into a second digital format for transmission. For example, multimedia input 214 can include a compressed MPEG2/4 input. The encoder module 230 operates to decompress the signal and re-encode it in another format, such as H.264. In addition, encoder module 230 can receive a multimedia input signal that is in a digital format such as High-Definition Multimedia Interface (HDMI). The encoder module 230 can compress and encode the digital signal into a compressed digital format.

In an embodiment of the present invention, transceiver module 234 is selectively tunable to a plurality of other carrier frequencies in response to channel selection signal 220. For instance, in an implementation of the multimedia server module 12 and client module 200 using wireless transmission link in the United States that conforms with the IEEE 802.11g standard, channel A can be selected as any of the 11 allocated channels. In an embodiment of the present invention, the channel selection signals can be preprogrammed into multimedia server module 12, dynamically chosen based on a site survey that scans the available channels to determine a suitable channel for use, received from the client module 200 or arbitrated between the client module 200 and multimedia server module 12, or selected under user control. Similarly, channel A can be implemented as a channel of a broadband wireless access network that conforms to at least one of the following standards: 802.11a, b, n or other 802.11 standard, Ultra Wideband (UWB), or Worldwide Interoperability for Microwave Access (WiMAX).

Transceiver module 234 modulates the encoded signal 232 to produce an RF signal 236 that includes multimedia content such as a packetized video signal at a first carrier frequency and transmits the RF signal 236 over channel A using antenna 206. In addition, transceiver module 234 produces encoded control signals 144 by demodulating an RF signal received from the client module 200 over channel A.

A command generator module 322 generates multimedia device commands 152 based on the encoded control signals 144. In an embodiment of the present invention, the remote control signals generated by remote control device 140 include a selection command. For example, the remote control signals may select a particular television channel, a particular selection from a CD or DVD, or may provide commands to pause, rewind or fast forward playback of audio or video programming, or may adjust the audio volume of audio playback, etc. As previously discussed, these remote control signals are encoded to produce the encoded control signals 144 that are transmitted over the communication link between the client module and the multimedia server module 214 via a link signal.

In an embodiment of the present invention, the encoded control signals 144 include digital remote control signals obtained by sampling and digitizing the remote control signals 142 from remote control unit 140. In this embodiment, the command generator 322 includes a digital to analog converter that generates the multimedia device commands 152 by converting the digital remote control signal to an analog remote control signal. In an alternative embodiment of the present invention, the encoded control signals include a device command and optionally a device indicator and the command generator module 322 generates the multimedia control commands based on the device command and/or device indicator. In this embodiment, the command generator module 322 can, via a look up table or other logic or circuitry, reproduce an analog remote control signal that corresponds to the format of the particular multimedia device 150 and that is associated with the particular device command such as a selection command that changes some aspect of the multimedia signal 214 (e.g. increase volume, decrease volume, change channel, fast forward, select menu, retrieve messages, etc) or provide other setup or control info such as record options, playback options, etc.

Remote transmitter module 320 wirelessly transmits the multimedia device commands 152 to the multimedia device 150. For instance, when the multimedia device commands 152 includes a selection command, the multimedia device 150 changes the multimedia signal 214 in response to the selection command.

In an embodiment of the present invention, remote transmitter module 320 includes driver circuitry and an infrared emitter such as a light-emitting diode (LED) or laser diode that produces a remote control signal in the format of remote control device 140. The infrared emitter can be incorporated in the housing of multimedia server module 12 for positioning within a line of sight of the corresponding infrared detector of multimedia device 150. Alternatively, the infrared emitter can be incorporated in a separate housing at the end of a cable that is coupled to the multimedia server module 12. In this fashion, the infrared emitter can be more flexibly positioned for alignment with the infrared detector of multimedia device 150. While the description above contemplates infrared transmission by remote control device 140, remote transmitter module 320 may likewise conform with other wireless remote control links including Bluetooth or other RF links and other optical links.

In an embodiment of the present invention, portions of the transceiver module 234 and remote transmitter module 320, the encoder module 230 and the command generator module 322 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital), optionally based on operational instructions that are stored in a memory that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when these modules of multimedia server module 12 implement one or more of its functions via a state machine, analog circuitry, digital circuitry, and/or logic circuitry based on operational instructions, the memory storing the corresponding operational instructions may be embedded within, or external to, the circuitry comprising the state machine, analog circuitry, digital circuitry, and/or logic circuitry.

FIG. 5 presents a block diagram representation of a client module 200 in accordance with an embodiment of the present invention. In particular, client module 200 includes transceiver module 244 for receiving RF signal 246 over channel A or an alternate channel selected by multimedia server module 12 and for converting the RF signal 246 into a received encoded signal 248. In addition, transceiver module 244 is operable to modulate back channel input 272 to produce RF signals sent to multimedia server module 12 over channel A.

A remote receiver module 330 receives remote control signals 142 from a remote control device, such as remote control device 140, formatted for reception by the multimedia device 150. Remote control signal encoder module 332 encodes the remote control signals into encoded control signals 144 for transmission to the multimedia server module 12 by the transceiver module 244.

In an embodiment of the present invention, the remote control encoder module 332 includes an analog to digital converter that samples and digitizes the remote control signals into a digital remote control signal, and the remote control encoder module 332 produces encoded control signals 144 that include at least one data packet that includes the digital remote control signal. Alternatively, the remote control encoder module 332 decodes the remote control signals 142 to determine the a device command (that identifies the command being sent from remote control device 140), and optionally a device indicator (that identifies the particular remote control device 142 and/or the particular multimedia device 150 associated therewith, either based on the format of the remote control signals or by based on data contained in the remote control signals) to produce a device command such as a key code, other command and/or device indicator and to generate encoded control signals 144 that include at least one data packet that includes the device command and/or device indicator.

Further when one or more remote control devices are used, remote control encoder module 332 can operate in either mode of operation described above, by first attempting to decode the remote control signals to determine if they correspond to either a remote control device associated with the client module 200 or a decodable remote control device associated with a multimedia devices 150. If so, the remote control encoder module 332 proceeds to decode the remote control signals 142 to command client module 200 or to generate a corresponding data packet as described above. Otherwise, the remote control encoder module 332 proceeds to sample and digitize the remote control signals 142, also as described above.

In an embodiment of the present invention, remote receiver module 330 includes receiver circuitry and an infrared detector such as a photo-resister, photo-transistor, photo-diode or other photo detector that receives remote control signals from remote control device 140. The infrared detector can be incorporated in the housing of the client module 200 for positioning within a line of sight of the corresponding infrared emitter of remote control device 140. Alternatively, the infrared detector can be incorporated in a separate housing at the end of a cable that is coupled to the client module 200. In this fashion, the infrared detector can be more flexibly positioned for alignment with one or more client devices coupled to the client module 200. While the description above contemplates infrared transmission by remote control device 140, remote receiver module 330 may likewise conform with other wireless remote control links including Bluetooth or other RF links and other optical links.

In an embodiment of the present invention, multimedia server module 12 and client module 200 use a wireless transmission link that conforms with the IEEE 802.11 g standard that uses a 52-subcarrier orthogonal frequency division multiplexing (OFDM) with a maximum data rate of 54 Mbits/sec. The data rate is reduced in increments in response to adverse channel conditions from 48 mbits/sec, down to as low as 6 Mbits/sec by modifying the modulation and effective coding rate from 64-quadrature amplitude modulation (64-QAM) to binary phase shift keying (BPSK). The 52 subcarriers of a channel are spaced 312.5 kHz apart, where 48 of the subcarriers carry data, and 4 subcarriers carry pilot tones. Received encoded signal 248 can be a baseband signal or a low intermediate frequency (IF) signal.

In an embodiment of the present invention, received encoded signal 248 can optionally be sent to decoder module 254 through a physical electronic connection such as Universal Serial Bus (USB), Personal Computer Interface (PCI), Firewire, or small computer service interface (SCSI), ASI (Asynchronous Serial Interface), or SPI (Serial Peripheral Interface). However, other physical electronic connections, either standard or proprietary may likewise be implemented or used within the broad scope of the present invention.

Client module 200 further includes decoder module 254 for decoding the received encoded signal 248 into a decoded output signal 216, such as in a format used by the attached client. In particular, further decoding of the data can include decompression of a compressed digital signal, formatting of a video signal as in NTSC, PAL, SECAM, etc., and other formatting to match the input format of the client device. As discussed above, transceiver module 244 receives and demodulates RF signal 246 to produce a received encoded signal 248.

In an embodiment of the present invention, the non-RF portions of transceiver module 244 and remote receiver module 330, the remote control encoder module 332 and the decoder module 254 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital), optionally based on operational instructions that are stored in a memory that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when these modules implement one or more of its functions via a state machine, analog circuitry, digital circuitry, and/or logic circuitry based on operational instructions, the memory storing the corresponding operational instructions may be embedded within, or external to, the circuitry comprising the state machine, analog circuitry, digital circuitry, and/or logic circuitry.

In an embodiment of the present invention, transceiver module 244 is selectively tunable to a plurality of other carrier frequencies in response to channel selection signals 224. For instance, in an implementation of the multimedia server module 12 and client module 200 using wireless transmission link in the United States that conforms with the IEEE 802.11g standard, channel A can be selected as any two of the 11 allocated channels. In an embodiment of the present invention, the channel selection signals can be preprogrammed into client module 200, dynamically chosen based on a site survey that scans the available channels to determine two suitable channels for use, received from the multimedia server module 12 or arbitrated between the client module 200 and multimedia server module 12, or selected under user control.

The description above has been limited to spectrum reserved for 802.11x compliant broadband access networks, in an alternative embodiment of the present invention, other spectrum and other wireless links including Ultra Wideband (UWB), Worldwide Interoperability for Microwave Access (WiMAX) and other wireless links can likewise be implemented.

Figure 6:
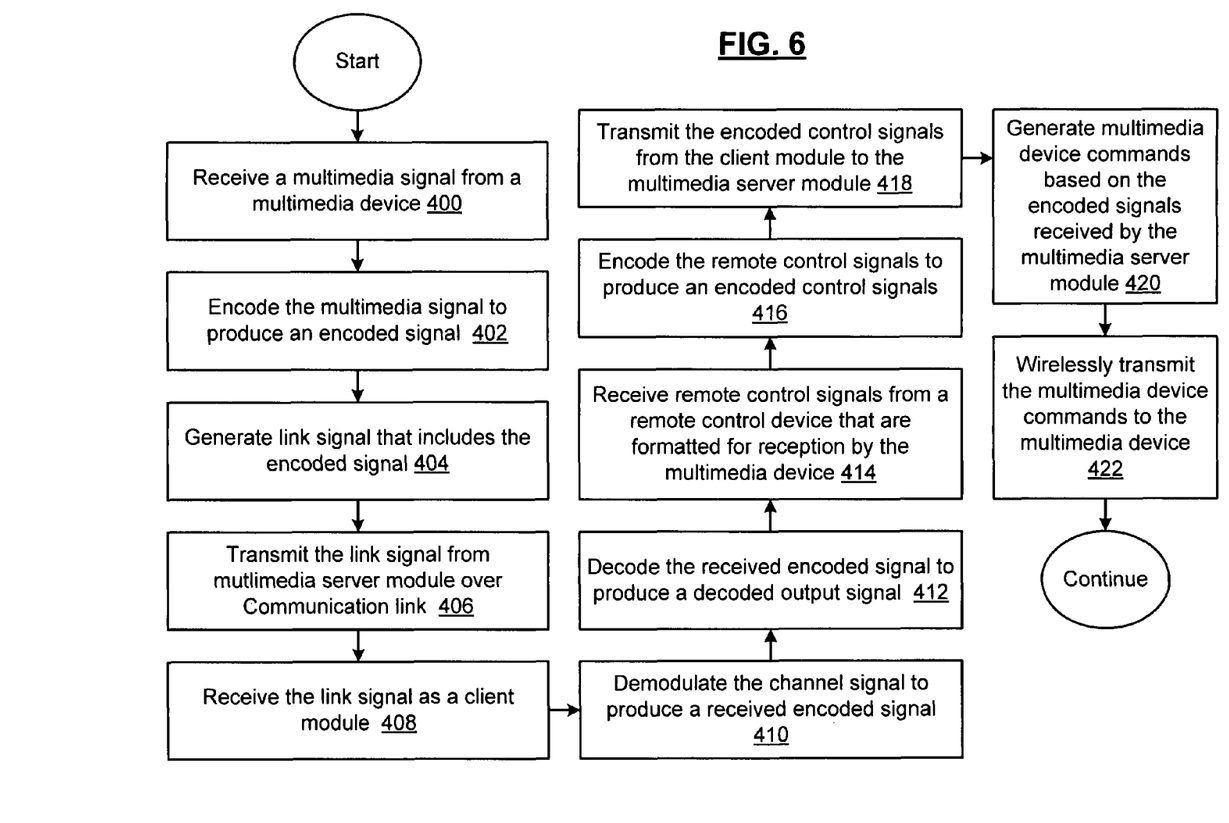
FIG. 6 presents a flow chart representation of a method in accordance with an embodiment of the present invention.

FIG. 6 presents a flow chart representation of a method in accordance with an embodiment of the present invention. In particular, a method is presented for use in conjunction with one or more of the functions and features described in association with FIGS. 1-5. In step 400, a multimedia signal is received from a multimedia device. In step 402, the multimedia signal is encoded to produce an encoded signal. In step 404, a link signal is generated that includes the encoded signal. In step 406, the link signal is transmitted over the RF communication link from the multimedia server module. In step 408, the link signal is received at a client module. In step 410, the link signal is demodulated to produce a received encoded signal. In step 412, the received encoded signal is decoded into a decoded output signal.

In step 414, remote control signals are received from a remote control device wherein the remote control signals are formatted for reception by the multimedia device. In step 416, the remote control signals are encoded into encoded control signals. In step 418, the encoded control signals are transmitted from the client module to the multimedia server module. In step 420, multimedia device commands are generated based on the encoded control signals received by the multimedia server module. In step 422, the multimedia device commands are wirelessly transmitted to the multimedia device.

In an embodiment of the present invention, the remote control signals include a selection command, wherein the multimedia device commands include the selection command for the multimedia device to change the multimedia signal.

In an embodiment of the present invention, step 416 can include sampling and digitizing the remote control signals into a digital remote control signal and producing at least one data packet that includes the digital remote control signal and step 420 can include converting the digital remote control signal to an analog remote control signal. In another embodiment of the present invention, step 416 includes decoding the remote control signals to produce a device command and/or device indicator and generating at least one data packet that includes the device command and/or device indicator. In this case, step 420 includes translating the device command to an analog remote control signal, optionally based on the device indicator.

In an embodiment, step 406 encodes or transcodes the multimedia signal in accordance with one of a Motion Picture Experts Group (MPEG) standard, and a Society of Motion Picture and Television Engineers (SMPTE) standard. Further, step 410 transmits the RF signal over a broadband wireless access network that conforms to at least one of the following standards: 802.11x, Ultra Wideband (UWB), and Worldwide Interoperability for Microwave Access (WiMAX).

Figure 7:
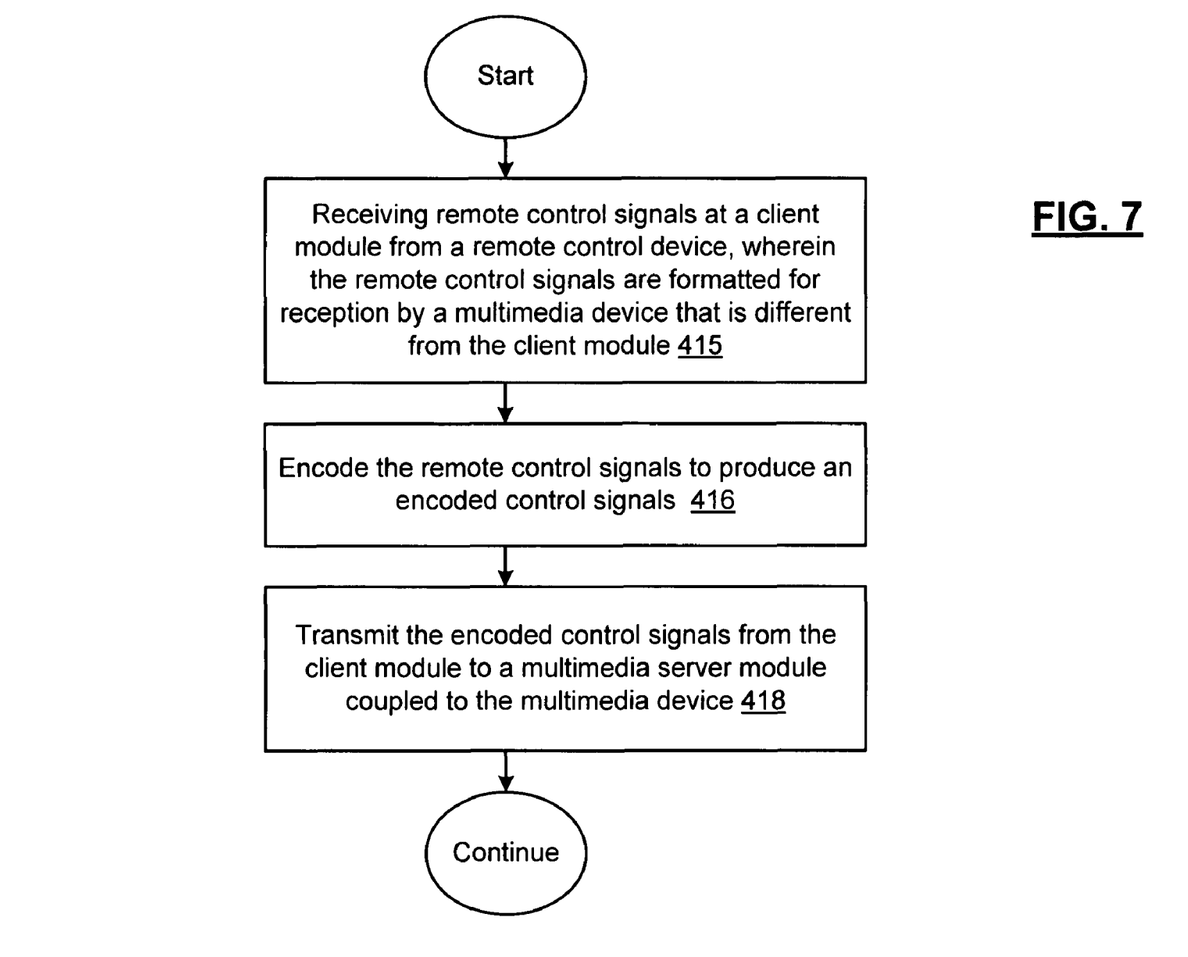
FIG. 7 presents a flow chart representation of a method in accordance with an embodiment of the present invention.

FIG. 7 presents a flow chart representation of a method in accordance with an embodiment of the present invention. In particular, a method is presented for use in conjunction with one or more of the functions and features described in association with FIGS. 1-6. In step 415, remote control signals are received at a client module from a remote control device wherein the remote control signals are formatted for reception by a multimedia device that is different from the client module. In step 416 and 418 previously discussed in association with FIG. 6, remote control signals are encoded into encoded control signals that are transmitted from the client module for reception by a multimedia server module that is coupled to the multimedia device.

In an embodiment of the present invention the remote control signals include a selection command, wherein the multimedia device commands include the selection command for the multimedia device to change a multimedia signal that is transmitted from the multimedia server module to the client module.

In an embodiment of the present invention, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to order of magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more module functions such as the processing of an input signal to produce an output signal. As used herein, a module may contain submodules that themselves are modules. When implemented in software or firmware, each module can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Thus, there has been described herein an apparatus and method, as well as several embodiments including a preferred embodiment, for implementing a multimedia client/server system, multimedia server module, and client module. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A multimedia client/server system comprising:

a multimedia server, coupleable to a multimedia device that produces a multimedia signal, the multimedia server including an encoder module that encodes the multimedia signal to produce an encoded signal, a server transceiver module, coupled to the encoder module, that produces a link signal that includes the encoded signal, that transmits the link signal over a communication link, a command generator module, coupled to the server transceiver module that generates multimedia device commands, and a remote transmitter module, coupled to the command generator module, that wirelessly transmits the multimedia device commands to the multimedia device; and a multimedia client, coupleable to at least one client device, the multimedia client including a client transceiver that receives and demodulates the link signal over the communications link to produce a received encoded signal, a decoder module, coupled to the client transceiver, that decodes the received encoded signal into a decoded output signal, a remote receiver module that receives remote control signals from a remote control device wherein the remote control signals are formatted for reception by the multimedia device, and a remote control signal encoder module, coupled to the remote receiver module and the client transceiver that encodes the remote control signals into encoded control signals for transmission to the multimedia server by the client transceiver by:

decoding the remote control signals to determine when a device command is recognized;

generating device command data based on the device command and generating the encoded control signals to include the device command data, when the device command is recognized; and sampling and digitizing the remote control signals into digitized samples of the remote control signals to generate the encoded control signals when the device command is not recognized, wherein the encoded control signals include a data packet having the digitized samples of the remote control signals when the device command is not recognized;

wherein the server transceiver module receives the encoded control signals and the command generator generates the multimedia device commands based on the encoded control signals.

2. The multimedia client/server system of claim 1 wherein the remote control signals include a selection command, wherein the multimedia device commands include the selection command, wherein the multimedia device changes the multimedia signal in response to the selection command.

3. The multimedia client/server system of claim 1 wherein the command generator generates the multimedia device commands by converting the digital remote control signal to an analog remote control signal.

4. The multimedia client/server system of claim 1 wherein the command generator generates the multimedia device commands based on the received device command.

5. The multimedia client/server system of claim 1 wherein the remote control encoder module decodes the remote control signals to further produce a device indicator and wherein the at least one data packet includes the device indicator.

6. The multimedia client/server system of claim 5 wherein the command generator generates the multimedia device commands based on the received device type.

7. The multimedia client/server system of claim 1 wherein communication link includes a broadband wireless access network that conforms to at least one of the following standards: 802.11x, Ultra Wideband (UWB), and Worldwide Interoperability for Microwave Access (WiMAX).

8. The multimedia client/server system of claim 1 wherein the communication link includes a wired communication path.

9. A method comprising:
- receiving a multimedia signal from a multimedia device;
- encoding the multimedia signal to produce an encoded signal;
- producing a link signal that includes the encoded signal;
- transmitting the link signal over a communication link between a multimedia server module and a client module;
- receiving the link signal over the communications link;
- demodulating the link signal to produce a received encoded signal;
- decoding the received encoded signal into a decoded output signal that is formatted for a client device;
- receiving remote control signals from a remote control device wherein the remote control signals are formatted for reception by the multimedia device;
- encoding the remote control signals into encoded control signals module by:
- decoding the remote control signals to determine when a device command is recognized;
- generating device command data based on the device command and generating the encoded control signals to include the device command data, when the device command is recognized; and
- sampling and digitizing the remote control signals to generate the encoded control signals when the device command is not recognized into digitized samples of the remote control signals to generate the encoded control signals when the device command is not recognized, wherein the encoded control signals include a data packet having the digitized samples of the remote control signals when the device command is not recognized;
- transmitting the encoded control signals from the client module to the multimedia server module via the communication link;
- generating multimedia device commands based on the encoded control signals received by the multimedia server module; and
- wirelessly transmitting the multimedia device commands to the multimedia device.

10. The method of claim 9 wherein the remote control signals include a selection command, wherein the multimedia device commands include the selection command for the multimedia device to change the multimedia signal.

11. The method of claim 9 wherein the step of generating the multimedia device commands includes converting the digital remote control signal to an analog remote control signal.

12. The method of claim 9 wherein the step of generating the multimedia device command includes translating the device command to an analog remote control signal.

13. The method of claim 9 wherein the step of encoding the remote control signal further includes decoding the remote control signals to produce a device indicator and the least one data packet includes the device indicator.

14. The method of claim 9 wherein the step of generating the multimedia device command includes translating the device command to an analog remote control signal based on the device indicator.

15. A client device that has a processor and at least one client module, the client module comprising:
- a client transceiver module that receives and demodulates a link signal from a multimedia server module over the communications link to produce a received encoded signal, the link signal including a multimedia signal from a multimedia device;
- a decoder module, coupled to the client transceiver module, that decodes the received encoded signal into a decoded output signal that is formatted for the at least one client device;
- a remote receiver module that receives remote control signals from a remote control device wherein the remote control signals are formatted for reception by the multimedia device; and
- a remote control signal encoder module, coupled to the remote receiver module and the client transceiver module, that encodes the remote control signals into encoded control signals for transmission to the multimedia server module by the client transceiver module by:
- decoding the remote control signals to determine when a device command is recognized;
- generating device command data based on the device command and generating the encoded control signals to include the device command data, when the device command is recognized; and
- sampling and digitizing the remote control signals into digitized samples of the remote control signals to generate the encoded control signals when the device command is not recognized, wherein the encoded control signals include a data packet having the digitized samples of the remote control signals when the device command is not recognized.

16. The client module of claim 15 wherein the remote control signals include a selection command to command multimedia device to change the multimedia signal.

17. The multimedia client module of claim 15 wherein the remote control encoder module decodes the remote control signals to further produce a device indicator and wherein the at least one data packet includes the device indicator.

* * * * *